United States Patent
Kim et al.

(10) Patent No.: US 12,249,154 B2
(45) Date of Patent: Mar. 11, 2025

(54) METHOD AND SYSTEM FOR LEARNING NEURAL NETWORK AND DEVICE

(71) Applicant: SAMSUNG ELECTRONICS CO., LTD., Suwon-si (KR)

(72) Inventors: Byeoungsu Kim, Hwaseong-si (KR); Sangsoo Ko, Yongin-si (KR); Kyoungyoung Kim, Suwon-si (KR); Sanghyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 972 days.

(21) Appl. No.: 17/195,835

(22) Filed: Mar. 9, 2021

(65) Prior Publication Data

US 2021/0334662 A1    Oct. 28, 2021

(30) Foreign Application Priority Data

Apr. 28, 2020  (KR) .................. 10-2020-0051818

(51) Int. Cl.
| | | |
|---|---|---|
| *G06N 3/082* | (2023.01) | |
| *G06F 18/214* | (2023.01) | |
| *G06V 10/82* | (2022.01) | |
| *G06V 20/56* | (2022.01) | |
| *G06V 20/58* | (2022.01) | |
| *G08G 1/048* | (2006.01) | |

(52) U.S. Cl.
CPC .......... *G06V 20/56* (2022.01); *G06F 18/2148* (2023.01); *G06N 3/082* (2013.01); *G06V 10/82* (2022.01); *G06V 20/58* (2022.01); *G08G 1/048* (2013.01)

(58) Field of Classification Search
CPC ........ G06V 20/56; G06V 10/82; G06V 20/58; G06F 18/2148; G06N 3/082; G06N 3/045; G06N 3/04; G08G 1/048; B60W 60/001; B60W 2555/20; G06T 2207/20084; G06T 5/00
See application file for complete search history.

(56) References Cited

U.S. PATENT DOCUMENTS 9,514,389 B1    12/2016  Erhan et al.
10,346,741 B2    7/2019  Winih et al.
(Continued)

FOREIGN PATENT DOCUMENTS

JP    5385056 B2    1/2014
KR    10-2039146 B1    10/2019

OTHER PUBLICATIONS

Bojarski et al., "End to End Learning for Self-Driving Cars," arXiv:1604.07316v1, Apr. 25, 2016, Total 9 pages.
(Continued)

*Primary Examiner* — Li B. Zhen
*Assistant Examiner* — Henry Nguyen
(74) *Attorney, Agent, or Firm* — Sughrue Mion, PLLC

(57) ABSTRACT

A method of operating a neural network device including a plurality of layers, includes receiving sensing data from at least one sensor, determining environmental information, based on the received sensing data, determining multiple layers corresponding to the determined environmental information, and dynamically reconstructing the neural network device by changing at least two layers, among the plurality of layers, to the determined multiple layers.

20 Claims, 17 Drawing Sheets

(56) References Cited

U.S. PATENT DOCUMENTS

| | | | |
|---|---|---|---|
| 2016/0259995 A1* | 9/2016 | Ishii | G06N 3/08 |
| 2018/0218254 A1* | 8/2018 | Feng | G06N 20/00 |
| 2018/0281812 A1 | 10/2018 | Tochioka et al. | |
| 2019/0050729 A1 | 2/2019 | Lakshmanan et al. | |
| 2019/0095805 A1 | 3/2019 | Tristan et al. | |
| 2019/0362235 A1* | 11/2019 | Xu | G06N 3/04 |
| 2020/0209846 A1* | 7/2020 | Chen | G05D 1/0231 |
| 2020/0301013 A1* | 9/2020 | Banerjee | G01S 17/931 |
| 2020/0349449 A1* | 11/2020 | Wang | G06V 10/764 |
| 2020/0356846 A1* | 11/2020 | Saripalli | G06N 3/045 |
| 2021/0027141 A1* | 1/2021 | MacAvaney | G06F 17/15 |
| 2021/0199850 A1* | 7/2021 | Schmude | G06N 3/044 |
| 2021/0279585 A1* | 9/2021 | Keski-Valkama | G06N 20/00 |
| 2021/0357648 A1* | 11/2021 | Metaxas | G06F 17/15 |
| 2022/0172594 A1* | 6/2022 | Cho | G08B 7/06 |

OTHER PUBLICATIONS

Dosovitskiy et al., "CARLA: an Open Urban Driving Simulator," arXiv:1711.03938v1, Nov. 10, 2017, Total 16 pages.

\* cited by examiner

FIG. 5A

| WEATHER INFORMATION | PREPROCESSING MODULE |
|---|---|
| Day | $PP_D$ LAYERS |
| Night | $PP_N$ LAYERS |
| Rainy | $PP_R$ LAYERS |
| Snowy | $PP_S$ LAYERS |
| Night + Rainy | $PP_{NR}$ LAYERS |
| ... | ... |
| Night + Snowy | $PP_{NS}$ LAYERS |

FIG. 5B

| POSITION INFORMATION | DECISION MODULE |
|---|---|
| Urban | $OC_U$ LAYERS |
| Highway | $OC_H$ LAYERS |
| Suburban | $OC_S$ LAYERS |
| Children Protection Area | $OC_C$ LAYERS |
| ... | ... |
| Parking lot | $OC_P$ LAYERS |

FIG. 9

| POSITION INFORMATION | FEATURE POINT EXTRACTION MODULE |
|---|---|
| Urban | $FE_1$ LAYERS |
| Highway | $FE_2$ LAYERS |
| ... | ... |

METHOD AND SYSTEM FOR LEARNING NEURAL NETWORK AND DEVICE

CROSS-REFERENCE TO THE RELATED APPLICATION

This application claims the benefit of Korean Patent Application No. 10-2020-0051818, filed on Apr. 28, 2020, in the Korean Intellectual Property Office, the disclosure of which is incorporated herein in its entirety by reference.

BACKGROUND

The inventive concept relates to a method for learning a neural network and a device thereof, and more particularly, to a method for learning a neural network and a device thereof, which are adaptive to environmental information.

An artificial intelligence (AI) system is a computer system implementing human level intelligence, in which the computer system machine learns and determines by itself and becomes smart. Because a recognition rate of the AI system increases and the AI system may correctly understand a taste of a user as the AI system is used, recently, the AI system has been applied to each of various kinds of electronic devices and data processing systems.

Each of various kinds of neural network models based on machine learning or deep learning may be applied to the AI system. To adaptively cope with various situations, when one neural network is learned, a large amount of learning data may be required. In addition, when a plurality of neural networks corresponding to the various situations are stored and learned, memory use may be inefficient.

SUMMARY

The inventive concept relates to a method for learning a neural network and a device thereof, in which a memory is efficiently used by adaptively forming the neural network according to various driving environments of a host vehicle, and a neural network system including the same.

According to an aspect of the inventive concept, there is provided a method of operating a neural network device including a plurality of layers, the method including receiving sensing data from at least one sensor, determining environmental information, based on the received sensing data, determining multiple layers corresponding to the determined environmental information, and dynamically reconstructing the neural network device by changing at least two layers, among the plurality of layers, to the determined multiple layers.

According to an aspect of the inventive concept, there is provided a neural network device including a plurality of layers, the neural network device including at least one sensor configured to obtain sensing data, and a processor configured to determine environmental information, based on the obtained sensing data, determine multiple layers corresponding to the determined environmental information, and dynamically reconstruct the neural network device by changing at least two layers, among the plurality of layers, to the determined multiple layers.

According to an aspect of the inventive concept, there is provided a host vehicle device including a neural network device including a plurality of layers, and a vehicle controller configured to control a host vehicle, based on an output of the neural network device. The neural network device may include at least one sensor configured to obtain sensing data, and a processor configured to determine environmental information, based on the obtained sensing data, determine multiple layers corresponding to the determined environmental information, and dynamically reconstruct the neural network device by changing at least two layers, among the plurality of layers, to the determined multiple layers.

BRIEF DESCRIPTION OF THE DRAWINGS

Embodiments of the inventive concept will be more clearly understood from the following detailed description taken in conjunction with the accompanying drawings in which:

FIG. 5A is a mapping table of environmental information and a preprocessing module according to an embodiment of the inventive concept;

FIG. 5B is another example of a mapping table of environmental information and a preprocessing module according to an embodiment of the inventive concept;

FIG. 9 is a mapping table of environmental information and a feature point processing module according to an embodiment of the inventive concept.

DETAILED DESCRIPTION OF THE EMBODIMENTS

Hereinafter, embodiments of the inventive concept will be described in detail with reference to the accompanying drawings.

Figure 1:
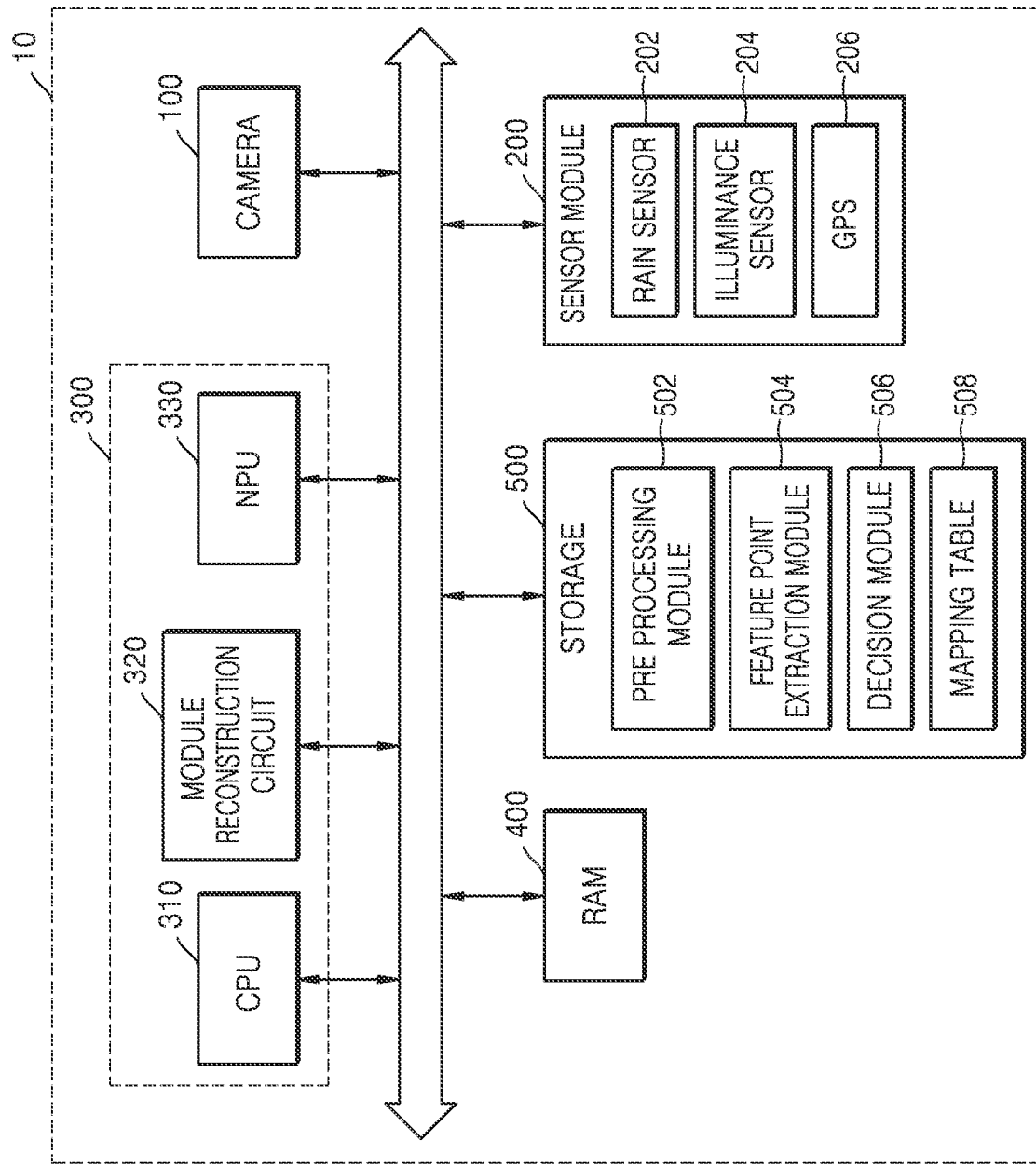
FIG. 1 is a block diagram of an electronic device according to an embodiment of the inventive concept.

FIG. 1 is a block diagram of an electronic device 10 according to an embodiment of the inventive concept.

Referring to FIG. 1, the electronic device 10 may extract valid information by analyzing input data and may generate output data based on the extracted information. The input data may correspond to an image obtained by capturing a peripheral environment of the electronic device 10 and the valid information may correspond to an object (for example, another driving vehicle or a person) included in the captured image. For example, the electronic device 10 may detect or segment at least one object included in the image. On the other hand, a kind of an image processing operation is not limited to the above-described example and various image processing operations may be performed.

According to various embodiments, the electronic device 10 may be implemented by a personal computer (PC), an Internet of things (IoT) device, or a portable electronic device. The portable electronic device may be provided in each of various devices such as a laptop computer, a mobile telephone, a smartphone, a tablet personal computer (PC), a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, and a wearable device.

According to various embodiments, the electronic device 10 may include a camera 100, a sensor module 200, a processor 300, random access memory (RAM) 400, and a storage 500.

The camera 100 included in the electronic device 10 may receive an image signal for a peripheral environment and may output the received image signal as an image. For example, the camera 100 may generate an image by converting light for an external environment ahead or in various directions into electrical energy and may output the generated image to the processor 300. In an embodiment, when the electronic device 10 controls an autonomous driving vehicle, an image sensor may receive an image signal for a peripheral environment of the autonomous driving vehicle and may output the received image signal as the image. In the above-described embodiment, the camera 100 is described as being included in the electronic device 10. However, the inventive concept is not limited thereto and the camera 100 may be arranged outside the electronic device 10 and may output the received image signal to the electronic device 10 as the image.

The sensor module 200 may sense a physical signal for the periphery of the electronic device 10 and may generate sensing data. The sensor module 200 may include a rain sensor 202, an illuminance sensor 204, and a global positioning system (GPS) 206. For example, the sensor module 200 may sense whether it currently rains by using the rain sensor 202 or may determine whether it is day or night in accordance with an illuminance value at a sensing point in time by using the illuminance sensor 204. In the above-described embodiment, the sensor module 200 is described as including the rain sensor 202, the illuminance sensor 204, and the GPS 206. However, the inventive concept is not limited thereto. According to various embodiments, the sensor module 200 may further include any one or any combination of various kinds of sensing devices such as a side rear collision sensor, a light detection and ranging (lidar) sensor, a radio detection and ranging (radar) sensor, a time of flight (ToF) sensor, an ultrasonic sensor, and an infrared sensor.

According to various embodiments, the processor 300 may further include a central processing unit (CPU) 310, a module reconstruction circuit 320, and a neural processing unit (NPU) 330. The processor 300 may receive the sensing data from the sensor module 200, may dynamically reconstruct a plurality of layers included in a neural network in accordance with the received sensing data, and may perform image processing on various driving environments in accordance with the dynamically reconstructed neural network.

The CPU 310 controls all operations of the electronic device 10. The CPU 310 may include a processor core or a plurality of processor cores. The CPU 310 may process or execute programs and/or data stored in the storage 500. For example, the CPU 310 may control a function of the NPU 330 by executing the programs stored in the storage 500.

The module reconstruction circuit 320 may dynamically reconstruct the entire neural network by changing at least some of the plurality of layers constructing the neural network. For example, the module reconstruction circuit 320 may maintain layers extracting a feature point among the plurality of layers constructing the neural network and may change only layers performing image preprocessing used by a changed driving environment.

The module reconstruction circuit 320 may determine whether the at least some layers are to be changed by receiving a control signal from the CPU 310 or directly receiving the sensing data from the sensor module 200. For example, when weather changes from "sunny" to "rainy" during driving of a vehicle, the module reconstruction circuit 320 may change layers close to an input end to layers trained or learned for image processing of a "precipitation" environment.

The NPU 330 may generate the neural network, may train or learn the neural network, may perform an operation based on received input data, may generate an information signal based on a result of performing the operation, or may retrain the neural network. Models of the neural network may include various kinds of models such as a convolution neural network (CNN) such as GoogleNet, AlexNet, or a VGG network, a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), restricted Boltzmann machine (RBM), a fully convolutional network, a long short-term memory (LSTM) network, and a classification network. However, the inventive concept is not limited thereto.

The NPU 330 may include a separate memory for storing programs corresponding to the models of the neural network. The NPU 330 may further include separate IP blocks for processing more operations for driving the neural network. For example, the separate IP blocks may further include a graphical processing unit (GPU) or an accelerator for rapidly performing an operation.

The RAM 400 may temporarily store programs, data, or instructions. For example, the programs and/or data stored in the storage 500 may be temporarily loaded on the RAM 400 in accordance with control or booting code of the CPU 310. For example, the RAM 400 may include dynamic RAM (DRAM), static RAM (SRAM), or synchronous DRAM (SDRAM).

The storage 500 for storing data may store an operating system (OS), various programs, and various data items. The storage 500 may correspond to non-volatile memory. For example, the storage 500 may include read only memory (ROM), flash memory, phase-change RAM (PRAM), magnetic RAM (MRAM), resistive RAM (RRAM), or ferroelectric RAM (FRAM). According to an embodiment, the storage 500 may be implemented by a hard disk drive (HDD) or a solid state drive (SSD).

According to various embodiments, the storage 500 may store a plurality of modules and a mapping table. The plurality of modules may include a preprocessing module 502 performing image preprocessing of generating a uniform input feature map by removing features that are not related to object recognition such as raindrops or snowflakes, a feature point extraction module 504 extracting a feature point from an input image or the input feature map, and a decision module 506 recognizing and/or classifying an object based on the extracted feature point. A mapping table 508 may include information mapped to a module capable of constructing at least some layers of the neural network in accordance with environmental information. The electronic device 10 may dynamically reconstruct the neural network learned in the environmental information only by receiving the environmental information with reference to the mapping table 508.

Figure 2:
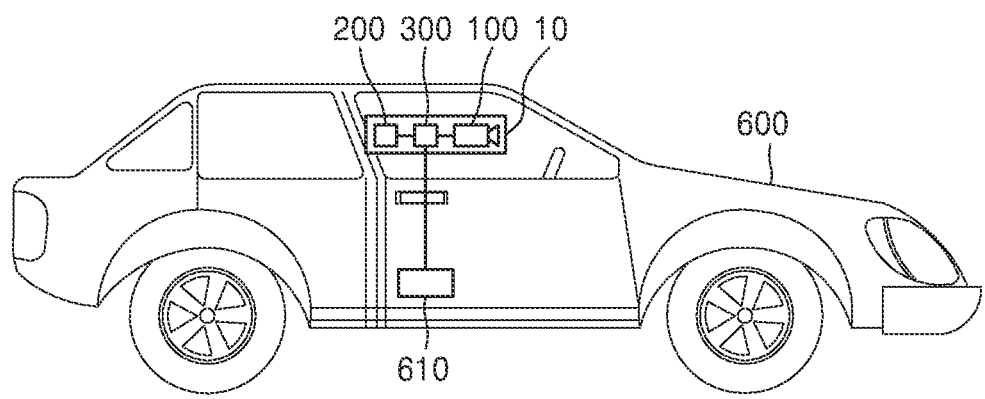
FIG. 2 is a diagram of a host vehicle including an electronic device according to an embodiment of the inventive concept.

FIG. 2 is a diagram of a host vehicle 600 including the electronic device 10 according to an embodiment of the inventive concept. In detail, FIG. 2 illustrates the host vehicle 600 including the electronic device 10 of FIG. 1.

Referring to FIGS. 1 and 2, the host vehicle 600 may include the electronic device 10 and a vehicle controller 610. The electronic device 10 may be arranged at an upper end of the host vehicle 600, and the camera 100 may obtain an image of the front of a road on which the host vehicle 600 is driving. On the other hand, a position in which the electronic device 10 is arranged is not limited to that of the current embodiment, and the electronic device 10 may be arranged in each of various positions of the host vehicle 600 according to an embodiment. In the current embodiment, the electronic device 10 may be configured to perform only an image processing operation on an image captured by the camera 100 and to provide a result of the image processing operation to the vehicle controller 610.

The vehicle controller 610 may control overall driving of the host vehicle 600. The vehicle controller 610 may determine a peripheral situation of the host vehicle 600 and may control a driving direction or speed of the host vehicle 600 based on the determination result. In an embodiment, the vehicle controller 610 may control the driving direction or speed of the host vehicle 600 by receiving the result of the image processing operation (for example, object recognition and analysis result) of the electronic device 10, determining the peripheral situation of the host vehicle 600 based on the received processing result, and transmitting the control signal to a driver of the host vehicle 600 based on the determination result.

On the other hand, in the above-described embodiment, the vehicle controller 610 and the electronic device 10 are illustrated as being separate from each other. However, the inventive concept is not limited thereto. According to an embodiment, the electronic device 10 may include the vehicle controller 610 or the processor 300 of the electronic device 10 and the vehicle controller 610 may be implemented as one chip.

Figure 3A:
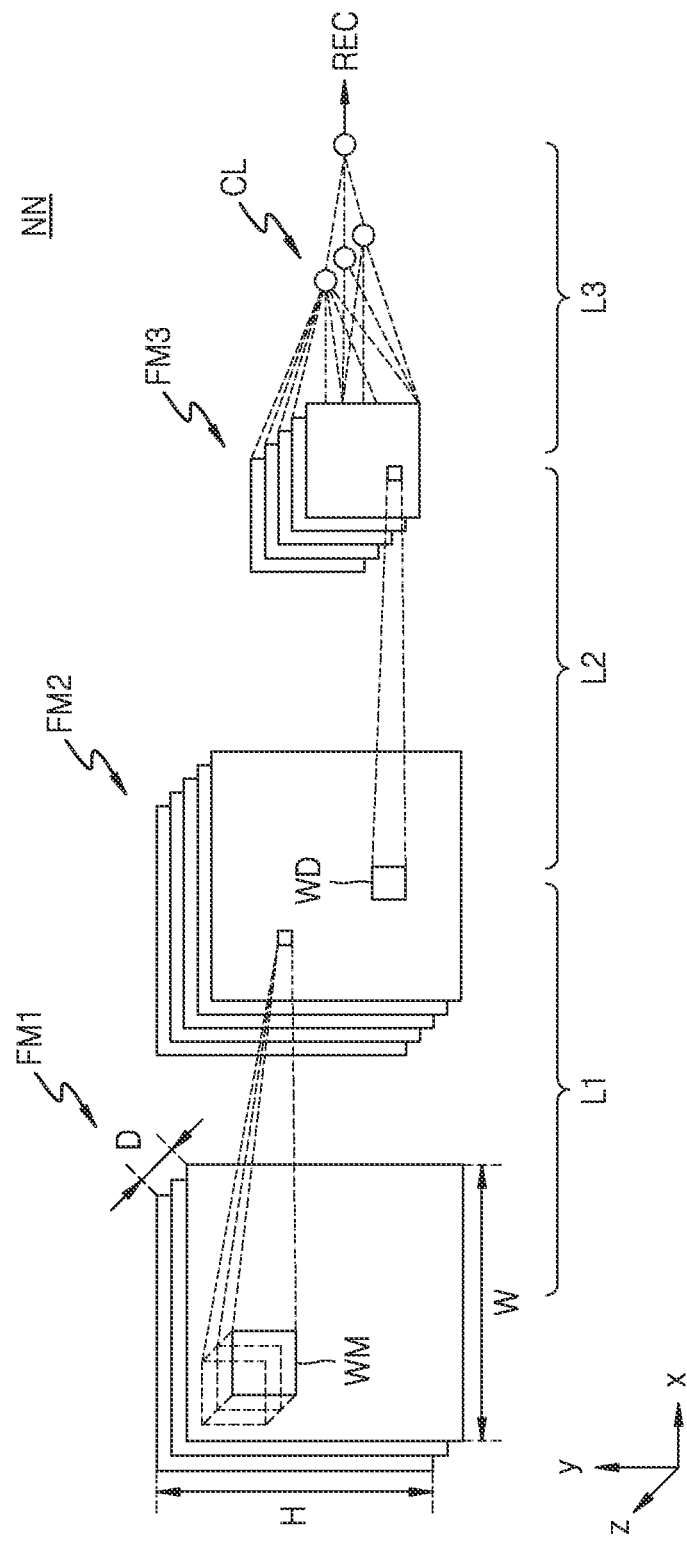
FIG. 3A is a diagram of a neural network and operation processing using the neural network.

FIG. 3A is a diagram of a neural network NN and operation processing using the neural network NN.

Referring to FIG. 3A, the neural network NN may include first to nth layers L1 to Ln. Each of the first to nth layers L1 to Ln may be a linear layer or a non-linear layer. According to an embodiment, at least one linear layer and at least one non-linear layer may be combined with each other and may be referred to as one layer. For example, the linear layer may include a convolution layer or a fully connected layer and the non-linear layer may include a sampling layer, a pooling layer, or an activation layer.

Exemplarily, the first layer L1 may be a convolution layer and the second layer L2 may be a sampling layer. The neural network may further include an activation layer and a layer performing another kind of operation.

Each of the plurality of layers may receive input image data or the input feature map generated by a previous layer and may generate an output feature map by using the input feature map. At this time, a feature map may mean data in which various features of the input data are expressed. Each of feature maps FM1, FM2, and FM3 may be in a two or three-dimensional matrix. Each of the feature maps FM1, FM2, and FM3 has a width W (or referred to as a column), a height H (or referred to as a row), and a depth D that may respectively correspond to an x axis, a y axis, and a z axis. At this time, the depth D may be referred to as the number of channels.

The first layer L1 may convolve the first feature map FM1 with a weight map WM and may generate the second feature map FM2. The weight map WM may filter the first feature map FM1 and may be referred to as a filter or a kernel. For example, a depth of the weight map WM, that is, the number of channels, is the same as the depth of the first feature map FM1, that is, the number of channels, and the same channels of the weight map WM and the first feature map FM1 may be convolved. The weight map WM is shifted to traverse by using the first feature map FM1 as a sliding window. An amount of shift may be referred to as "a stride length" or "stride". During the shift, each of weights included in the weight map WM may be multiplied by and added to every feature value in a region overlapping the first feature map FM1. As the first feature map FM1 and the weight map WM are convolved, one channel of the second feature map FM2 may be generated. In FIG. 2, one weight map WM is displayed. However, actually, a plurality of weight maps may be convolved with the first feature map FM1 so that a plurality of channels of the second feature map FM2 may be generated. That is, the number of channels of the second feature map FM2 may correspond to the number of weight maps.

The second layer L2 may generate the third feature map FM3 by changing a spatial size of the second feature map FM2. For example, the second layer L2 may be a sampling layer. The second layer L2 may perform up-sampling or down-sampling and may select some of data items included in the second feature map FM2. For example, a two-dimensional window WD may be shifted on the second feature map FM2 in a unit of a size (for example, a 4*4 matrix) of a window WD and may select a value of a position (for example, a first row and a first column) in a region overlapping with the window WD. The second layer L2 may output the selected data as data of the third feature map FM3. As another example, the second layer L2 may be a pooling layer. In this case, the second layer L2 may select a maximum or average value of feature values of the region overlapping the window WD in the second feature map FM2. The second layer L2 may output the selected data as data of the third feature map FM3.

Accordingly, the third feature map FM3 of which spatial size is changed may be generated from the second feature map FM2. The number of channels of the third feature map FM3 may be the same as the number of channels of the second feature map FM2. On the other hand, according to an embodiment of the inventive concept, an operation speed of the sampling layer may be higher than that of the pooling layer and the sampling layer may improve quality (for example, in terms of a peak signal to noise ratio (PSNR)) of an output image. For example, it may take longer to perform an operation by the pooling layer than to perform an operation by the sampling layer because a maximum or average value is to be calculated.

According to an embodiment, the second layer L2 is not limited to a sampling layer or a pooling layer. That is, the second layer L2 may be the convolution layer, similar to the first layer L1. The second layer L2 may generate the third feature map FM3 by convolving the second feature map FM2 with a weight map. In this case, the weight map performing the convolution operation in the second layer L2 may be different from the weight map WM performing the convolution operation in the first layer L1.

Through the plurality of layers including the first layer L1 and the second layer L2, an Nth feature map may be generated by an Nth layer. The Nth feature map may be input to a reconstruction layer positioned at a back end of the neural network NN from which the output data is output. The reconstruction layer may generate the output image based on the Nth feature map. In addition, the reconstruction layer may receive a plurality of feature maps such as the first feature map FM1 and the second feature map FM2 as well as the Nth feature map and may generate the output image based on the plurality of feature maps.

A third layer L3 may classify a class CL of input data by combining features of the third feature map FM3. In addition, the third layer L3 may generate a recognition signal REC corresponding to the class CL. For example, the input data may be data of an image or a moving picture frame. In this case, the third layer L3 may recognize an object and may generate the recognition signal REC corresponding to the recognized object by extracting a class corresponding to an object included in an image represented by frame data based on the third feature map FM3 provided by the second layer L2.

In the neural network NN, layers at lower levels, for example, convolution layers may extract features at lower levels (for example, an outline or a gradient of a vehicle) from input data or an input feature map and layers at upper levels, for example, fully connected layers may extract or detect features at upper levels, that is, classes (for example, a tail light of a vehicle and a rear glass of a vehicle) from an input feature map.

Figure 3B:
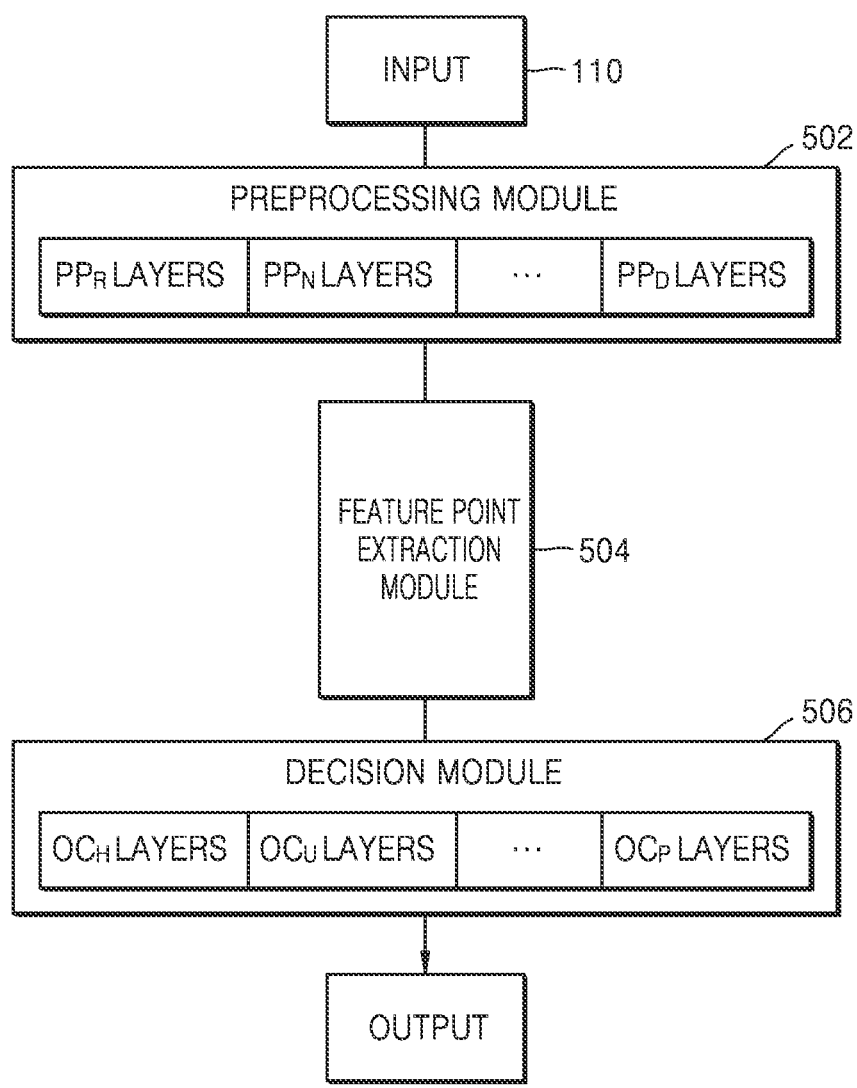
FIG. 3B is a diagram of a neural network according to an embodiment of the inventive concept.

FIG. 3B is a diagram of a neural network according to an embodiment of the inventive concept.

Referring to FIGS. 2 and 3B, an input image 110 may correspond to a front image of the host vehicle 600, which is obtained by the camera 100. For example, the input image 110 may further include shapes of falling raindrops when it rains and shapes of snowflakes when it snows. That is, the input image 110 may further include shapes that are not an object to be classified in accordance with the weather at a point in time at which the host vehicle 600 is driven.

The preprocessing module 502 may receive the input image 110 and may perform image processing of removing the shapes of snowflakes or raindrops capable of reducing an object recognition rate. In addition, the preprocessing module 502 may increase the object recognition rate by performing image processing of increasing brightness when the brightness is low.

According to various embodiments, the preprocessing module 502 may include a plurality of preprocessing groups. Each of the plurality of preprocessing groups may be mapped per weather information. For example, referring to FIG. 3B, the plurality of preprocessing groups may include $PP_R$ layers, $PP_N$ layers, and $PP_D$ layers. The $PP_R$ layers may perform an image processing operation of removing the shapes of raindrops in the input image 110 when it rains. The $PP_N$ layers may perform an image processing operation of increasing the brightness of the input image 110 when illuminance is low in the evening. The $PP_D$ layers may process the input image 110 at daytime of a fine day.

The feature point extraction module 504 may receive the input feature map from the preprocessing module 502 and may obtain feature point information. Here, the feature point information referring to information items for classifying the class of the object may include at least a portion of the object such as a straight line in a horizontal direction, a circle, a color (for example, a skin color of a person or a color of a lane), a license plate, or a window.

The decision module 506 may classify the class of the object based on the feature point information from the feature point extraction module 504. The decision module 506 may include a plurality of decision layers that vary in accordance with the position information. $OC_H$ layers may classify the class to be recognized when a vehicle is driven on the highway. For example, the $OC_H$ layers may classify a vehicle, a lane, and a color of the lane. $OC_U$ layers may classify the class to be recognized when a vehicle is driven through the city. For example, the $OC_U$ layers may classify a traffic light, a pedestrian, a bicycle, a motorcycle, a lane, and a vehicle.

Figure 4:
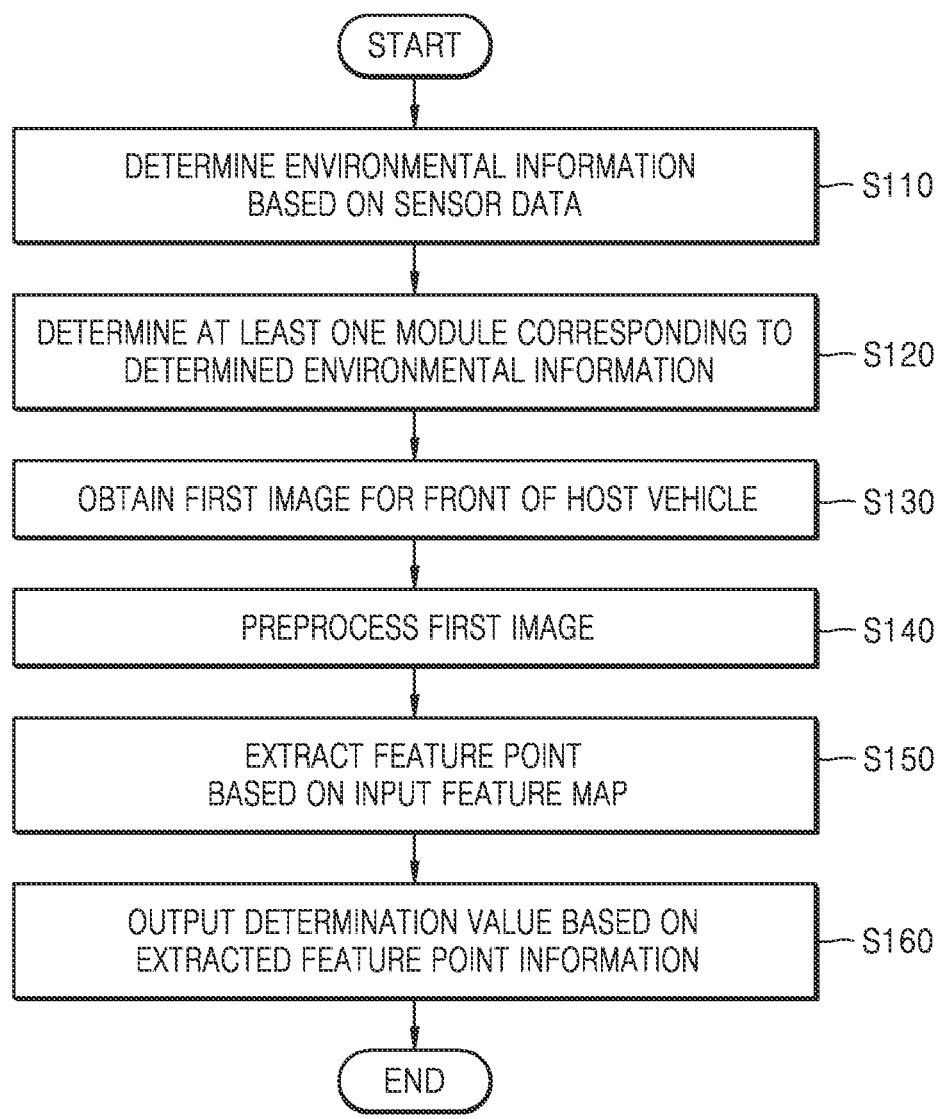
FIG. 4 is a flowchart of an operation of an electronic device according to an embodiment of the inventive concept.

FIG. 4 is a flowchart of an operation of the electronic device 10 according to an embodiment of the inventive concept.

Referring to FIG. 4, in operation S110, the electronic device 10 may determine the environmental information based on sensor data. Here, the environmental information may refer to information on a road environment in which the host vehicle 600 including the electronic device 10 is being driven. For example, the environmental information may include the weather information at the point in time at which the host vehicle 600 is being driven and the position information of the host vehicle 600 at the point in time at which the host vehicle 600 is being driven. The weather information may include information on the weather forecast such as "fine", "rainy", "snowy", or "hailing". The position information may include information on a place such as "urban", "highway", "suburban", or "a parking lot".

According to an embodiment, the processor 300 of the electronic device 10 may receive the sensing data from the sensor module 200 and may determine the environmental information based on the received sensing data. For example, the sensor module 200 may determine the brightness of a driving environment of the host vehicle 600 by measuring the brightness of light by using the illuminance sensor 204. In another example, the sensor module 200 may determine whether it rains during the driving of the host vehicle 600 by using the rain sensor 202. The rain sensor 202 may sense a wavelength between a sensor in the center of an upper end of a front glass of the host vehicle 600 emitting infrared light and the infrared light hitting the glass and emitting back to the sensor again. In addition, in another example, the sensor module 200 may determine the position information of the host vehicle 600 as a place such as "urban", "highway", "suburban", or "a parking lot" by identifying a position of the host vehicle 600 by using the GPS 206. According to an embodiment, based on the sensing data received from the sensor module 200, when it is determined that an illuminance value is greater than a threshold value, that an output value of the rain sensor 202 is "0", and that the position of the host vehicle 600 based on a signal of the GPS 206 is "highway", the processor 300 may determine that the host vehicle 600 is driven "on the highway at a fine day".

In operation S120, the electronic device 10 may determine the preprocessing module 502 and the decision module 506 (at least one module) corresponding to the environmental information. The module reconstruction circuit 320 may determine layers mapped to the environmental information. For example, when the weather information is "rainy" in the environmental information, the module reconstruction circuit 320 may determine the $PP_R$ layers among the layers included in the preprocessing module 502. When the position information is "highway" in the environmental information, the module reconstruction circuit 320 may determine the $OC_H$ layers mapped to "highway" among the layers included in the decision module 506.

According to various embodiments, the storage 500 may store the preprocessing module 502 and the decision module 506 in the previously mapped mapping table 508 per each of a plurality of driving environments. The processor 300 may determine layers to construct the preprocessing module 502 and the decision module 506 corresponding to environmental information in which the host vehicle 600 is being currently driven with reference to the mapping table 508. The processor 300 may transmit the control signal indicating the plurality of determined layers to the storage 500. The storage 500 may load the determined preprocessing module 502 and the decision module 506 on the RAM 400. At this time, the feature point extraction module 504 may be previously loaded on the RAM 400 and may construct at least some layers of the neural network without being changed by the processor 300.

In the above-described embodiment, it is illustrated that the processor 300 receives the sensing data and determines the environmental information in accordance with the mapping table 508. However, the inventive concept is not limited thereto. According to various embodiments, the sensor module 200 may directly transmit the sensing data to the module reconstruction circuit 320. The module reconstruction circuit 320 may receive the sensing data and may determine the preprocessing module 502 and the decision module 506 corresponding to the environmental information with reference to the mapping table 508. Then, the module reconstruction circuit 320 may transmit the control signal instructing to read the layers of the preprocessing module 502 and the decision module 506 to the storage 500.

In operation S130, the electronic device 10 may obtain a first image for the front of the host vehicle 600.

In operation S140, the electronic device 10 may obtain the input feature map by preprocessing the first image. The preprocessing may be performed by the layers of the preprocessing module 502 determined in operation S120 and loaded on the RAM 400. For example, when the host vehicle 600 is driven at night, the first image may have low illuminance. The preprocessing module 502 may correct brightness by using layers performing preprocessing of increasing histogram equalization or brightness of an image. The result of performing preprocessing on the first image may not correspond to the image of which brightness is increased and may be a feature map of the image of which brightness is increased.

In operation S150, the electronic device 10 may extract a feature point based on the input feature map. Here, the feature point referring to information items for classifying the class of the object may include at least a portion of the object such as a straight line in a horizontal direction, a circle, a color (for example, a skin color of a person or a color of a lane), a license plate, or a window. The feature point extraction module 504 may obtain the feature point information items included in the input feature map by performing convolution by using at least one filter (or kernel) such as a straight line in a horizontal direction, a circle, the color, a square, a license plate, or a window. The feature point information items may be generated by flattening the output feature map of the feature point extraction module 504.

In operation S160, the decision module 506 may output a determination value based on the extracted feature point information. The determination value indicating the result of recognizing and classifying the object of the input image or the input feature map may include a result of classifying various classes such as "a traffic light", "a pedestrian", "a bicycle", and "a motorcycle". For example, the decision module 506 may output "1" or "0" in accordance with whether each of "a traffic light", "a pedestrian", "a bicycle", and "a motorcycle" is on a lane on which the host vehicle 600 is being driven.

FIG. 5A is a mapping table of environmental information and a preprocessing module according to an embodiment of the inventive concept.

Referring to FIG. 5A, the mapping table 508 is illustrated between the weather information in the driving environment and the layers of the preprocessing module 502. The mapping table 508 may be stored in the storage 500.

According to an embodiment, "day" may refer to a fine day at daytime. That is, the "day" may be weather information when a value measured by the illuminance sensor is no less than the threshold value and the output value of the rain sensor is 0. When the weather information is the "day", the layers of the preprocessing module 502, which are mapped to the "day", may be the $PP_D$ layers. The $PP_D$ layers may perform at least one preprocessing operation of uniformly forming the input feature map input to the feature point extraction module 504 regardless of the weather information. For example, when the feature point extraction module 504 is AlexNet, the $PP_D$ layers may include an image processing operation of resizing an image to 224×224×3 that is a size of an image that may be input to the AlexNet. In addition, in another example, the $PP_D$ layers may perform contrast normalization to make images of a continuous frame have the same brightness. Image processing operations performed by the $PP_D$ layers are not limited thereto and may further include histogram equalization, whitening, zero centering, and max-min scaling.

According to another embodiment, "night" may refer to a fine day in the evening. That is, the "night" may be weather information when the value measured by the illuminance sensor is not greater than the threshold value and the output value of the rain sensor is 0. The layers of the preprocessing module 502, which are mapped to the weather information of "night", may be the $PP_N$ layers. The $PP_N$ layers may further include an image processing operation of generating the $PP_N$ layers to be the same as those of an input feature map after passing through the $PP_D$ layers. For example, the $PP_N$ layers may further perform image processing operations of increasing brightness of a dark first image because the brightness of the first image is low. Therefore, the electronic device 10 may transmit an input feature map in which the brightness of the first image is controlled to the feature point extraction module 504 through the $PP_N$ layers and may maintain the feature point extraction module 504 to be the same as that in the case in which the weather information is "day".

In addition, according to another embodiment, "rainy" may refer to a driving situation in which it rains. That is, when the output value of the rain sensor is 1, the weather information is determined as "rainy" and the layers of the preprocessing module 502, which are mapped to "rainy", may be the $PP_R$ layers. The $PP_R$ layers may further include an image processing operation of generating the $PP_R$ layers to be the same as those of the input feature map after passing through the $PP_D$ layers. For example, the $PP_R$ layers may remove objects corresponding to shapes of falling raindrops and/or shapes of raindrops on a windshield of the host vehicle 600 from the first image, may perform zero padding on a space from which the objects are removed, or may further perform an image processing operation of overwriting the objects with a color of a peripheral image. In addition, when the output value of the rain sensor is "1" and the output value of the illuminance sensor are not greater than the threshold value, the $PP_R$ layers may further perform an image processing operation of increasing brightness in addition to an image processing operation of removing the shapes of falling raindrops and/or the shapes of raindrops on the windshield of the host vehicle 600 from the first image.

FIG. 5B is another example of a mapping table of environmental information and a preprocessing module according to an embodiment of the inventive concept.

Referring to FIG. 5A, a mapping table is illustrated between the weather information in the environmental information and the decision module. The mapping table may be previously stored in the storage 500.

According to an embodiment, "urban" may correspond to the position information representing that the host vehicle 600 is driven through the city. The "urban" position information may be determined based on the signal received from the GPS 206. The layers of the decision module 506, which are mapped to the "urban" position information, may be $OC_U$ layers. The $OC_U$ layers may classify a class to be recognized when the host vehicle 600 is driven through the city. For example, the $OC_U$ layers may be implemented by a Softmax function and a label of the Softmax function of the $OC_U$ layers may include a traffic light, a pedestrian, a bicycle, a motorcycle, a lane, and a vehicle.

According to another embodiment, "highway" may correspond to the position information representing that the host vehicle 600 is being driven on the highway. The "highway" position information may be determined based on the signal received from the GPS 206. The layers of the decision module 506, which are mapped to the "highway" position information, may be $OC_H$ layers. The $OC_H$ layers may classify a class to be recognized when the host vehicle 600 is driven on the highway. For example, the $OC_H$ layers may be implemented by the Softmax function and the label of the Softmax function may include a vehicle, a lane, and a color of a lane. The $OC_H$ layers may more rapidly classify the class than the $OC_U$ layers because the number of labels (classes) of the Softmax function is small.

Figure 6A:
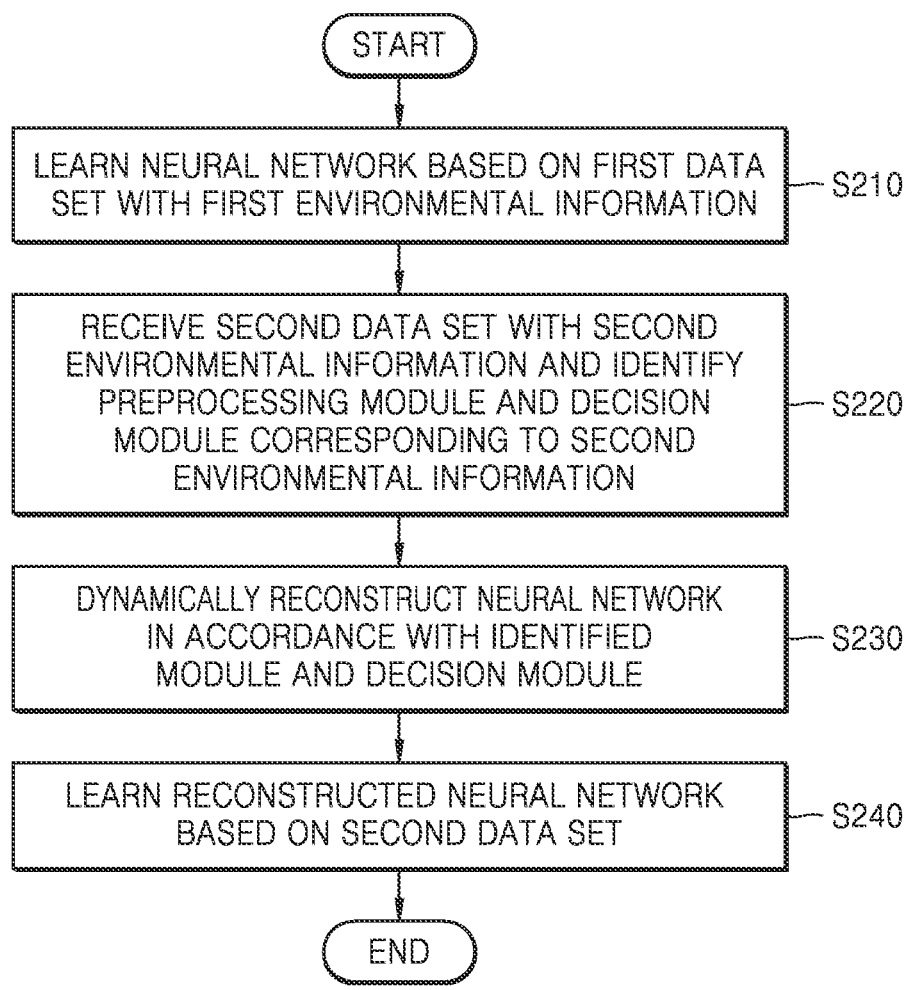
FIG. 6A is a flowchart of learning a neural network according to an embodiment of the inventive concept.

FIG. 6A is a flowchart of learning a neural network according to an embodiment of the inventive concept.

In operation S210, the electronic device 10 may learn the neural network based on a first data set. The first data set may refer to virtual driving data items in accordance with first environmental information. For example, the first environmental information may include "day" and "urban" information. That is, all of the virtual driving data items included in the first data set may represent that the host vehicle 600 is driven through the city in a fine day in the afternoon.

In operation S220, the electronic device 10 may receive a second data set and may identify the layers of the preprocessing module 502 and the decision module 506 corresponding to second environmental information. For example, the second environmental information may include "night+rainy" and "highway" information. That is, all of virtual driving data items included in the second data set may represent that the host vehicle 600 is driven on the highway in a rainy day in the evening. Because the electronic device 10 receives sensing data different from the environmental information of the first data set, the layers of the preprocessing module 502 corresponding to "night+rainy" and the layers of the decision module 506 corresponding to "highway" may be determined by using the mapping table 508.

In operation S230, the electronic device 10 may dynamically reconstruct the neural network in accordance with the identified layers of the preprocessing module 502 and the decision module 506. The electronic device 10 may maintain the layers of the feature point extraction module 504, which are loaded on the RAM 400, and may load the determined layers on the RAM 400. That is, the neural network may generate a new neural network by dynamically changing only the layers of the preprocessing module 502 and the decision module 506 while maintaining the feature point extraction module 504.

In operation S240, the electronic device 10 may learn the reconstructed neural network based on the second data set. At this time, the feature point extraction module 504 may newly learn only the layers of the preprocessing module 502 and the decision module 506 without learning the feature point extraction module 504, which is because the input feature map input to the feature point extraction module 504 is previously learned based on the first data set.

Figure 6B:
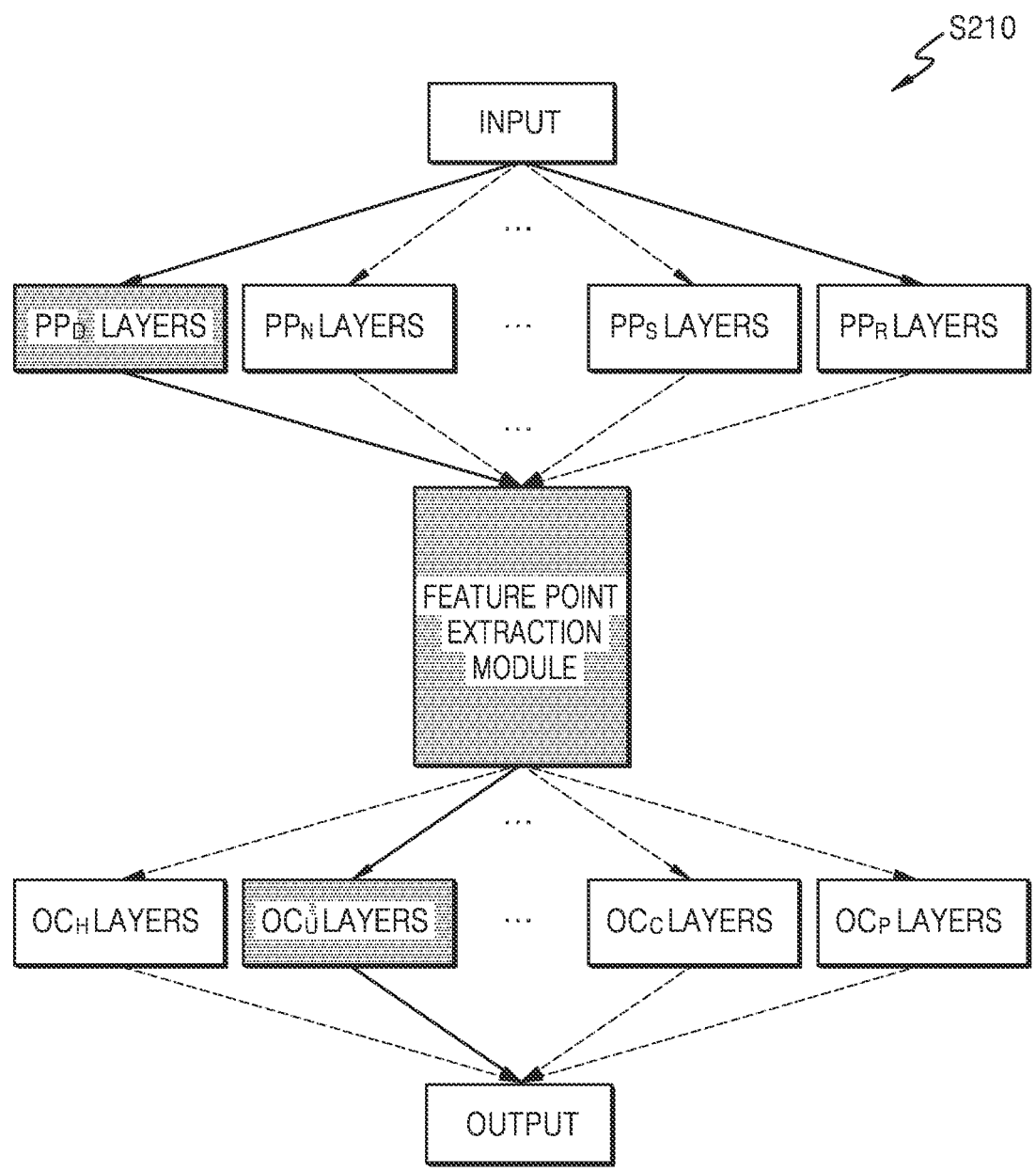
FIG. 6B is a diagram of learning a neural network according to an embodiment of the inventive concept.

FIG. 6B is a diagram of learning a neural network according to an embodiment of the inventive concept. Learning of the neural network illustrated in FIG. 6B may correspond to operation S210 of FIG. 6A.

Referring to FIG. 6B, the neural network may be learned based on training data. In the training data, the driving environment of the host vehicle 600 may be virtually set. For example, the training data may include various virtual driving environments including a virtual environment in which the host vehicle 600 is driven on the highway in a rainy day in the evening or a virtual environment in which the host vehicle 600 is driven through the city in a fine day at lunchtime. Hereinafter, for convenience sake, it is assumed that the neural network of FIG. 6A is learned in accordance with first training data representing that the host vehicle 600 is driven through the city in a fine day at lunchtime.

The processor 300 may determine the layers of the preprocessing module 502 and the layers of the decision module 506 with reference to the mapping table 508. Referring to FIGS. 5A, 5B, and 6B, the processor 300 may determine the MD layers for the preprocessing module 502 and the $OC_U$ layers for the decision module 506.

According to various embodiments, the MD layers of the preprocessing module 502 may preprocess a plurality of input images for the first train data and may generate an input feature map. The feature point extraction module 504 may receive the input feature map and may extract a feature point. For example, the feature point extraction module may include the convolution layers L1 and the pooling layers L2 illustrated in FIG. 3A. The $OC_U$ layers of the decision module 506 may classify a class to recognize an object based on feature point information. For example, the decision module 506 including the $OC_U$ layers may include the fully connected (FC) layers L3 illustrated in FIG. 3A. The $OC_U$ layers may include layers of an object to be recognized when the host vehicle 600 is being driven through the city. For example, the labels may include a traffic light, a pedestrian, a bicycle, a motorcycle, a lane, and a vehicle. The $OC_U$ layers of the decision module 506 may output whether an object corresponding to the labels is provided on a lane (hereinafter, referred to as a driving lane) on which the host vehicle 600 is being driven.

In various embodiments, the neural network may be learned based on a plurality of virtual driving data items in the same driving environment. For example, the neural network may learn the $PP_D$ layers of the preprocessing module 502, the plurality of layers of the feature point extraction module 504, and the $OC_U$ layers of the decision module 506 by repeatedly performing the learning based on the first data set. The neural network may update configuration parameters (for example, a network topology, a bias, and a weight) so that the reliability of the output value increases through the repeated learning. For example, in one virtual driving data item of the first data set, only a motorcycle may exist without a vehicle on the driving lane of the host vehicle 600 through the city in a fine day. In other virtual driving data items of the first data set, a bicycle and a pedestrian may be on the driving lane of the host vehicle 600 through the city in a fine day.

Figure 6C:
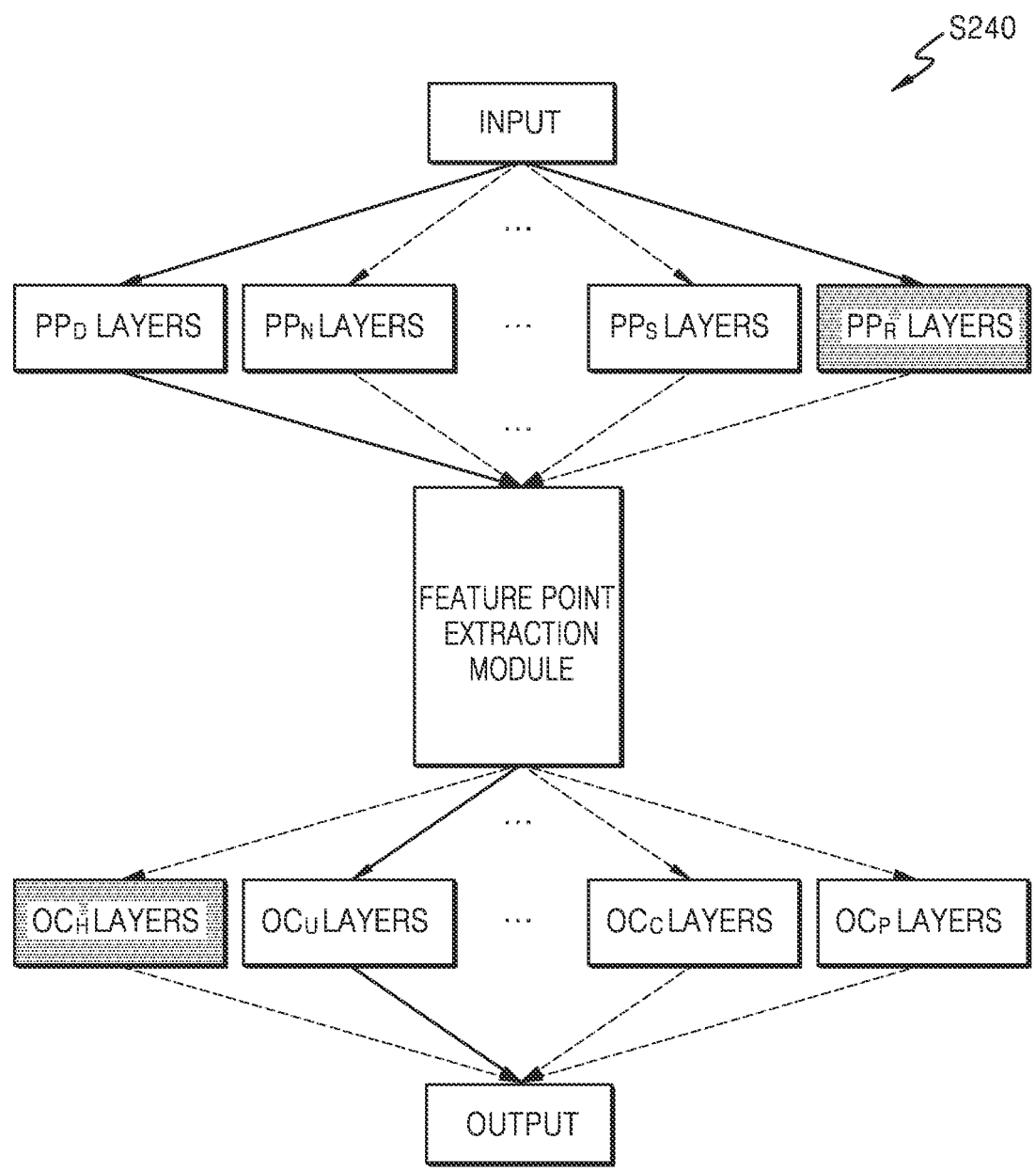
FIG. 6C is a diagram of learning a reconstructed neural network according to an embodiment of the inventive concept.

FIG. 6C is a diagram of learning a reconstructed neural network according to an embodiment of the inventive concept. The neural network of FIG. 6C may be obtained after performing learning as described with respect to FIG. 6B.

Referring to FIG. 6C, the neural network may perform the learning based on the training data. For example, the neural network may perform the learning in accordance with the second data set representing that the host vehicle 600 is driven on the highway in a rainy day in the evening.

According to various embodiments, referring to FIGS. 5A, 5B, and 6C, the processor 300 may determine the $PP_R$ layers of the preprocessing module 502 and the $OC_H$ layers of the decision module 506.

According to various embodiments, the $PP_R$ layers of the preprocessing module 502 may perform an image processing operation on an input image, may generate an input feature map, and may transmit the generated input feature map to the feature point extraction module 504. Here, the input image dark with low illuminance may include the shapes of falling raindrops. In addition, the input feature map may be the same as the input feature map passing through the $PP_D$ layers. The $PP_R$ layers of the preprocessing module 502 may perform an image processing operation be the same as the input feature map passing through the $PP_D$ layers by repeatedly learning images dark with low illuminance and including the shapes of falling raindrops.

According to various embodiments, the feature point extraction module 504 may bypass the learning based on second training data because the input feature map image processed by the $PP_D$ layers may be the same as the input feature map image processed by the $PP_R$ layers. That is, a feature point (for example, a square, a license plate, a horizontal straight line, or a circle) to be extracted by the layers of the feature point extraction module 504 may be the same. Therefore, the feature point extraction module 504 may be reused without additionally performing learning.

According to various embodiments, the $OC_H$ layers of the decision module 506 may classify a class for recognizing an object based on the extracted feature point information. Unlike the $OC_U$ layers of FIG. 6B, the number of labels (classes) to be recognized by the $OC_H$ layers in the second data set may be less. Because a bicycle, a motorcycle, a traffic light, and a pedestrian may not be on the highway, only a result of recognizing a lane, a color of the lane, and a vehicle may be output.

According to the above-described embodiment, although the environmental information changes, the neural network may bypass learning of the entire neural network again and may share the feature point extraction module 504. That is, although the environment in which the host vehicle 600 is driven changes, the neural network may perform learning on the layers of the preprocessing module 502 and the layers of the decision module 506 corresponding to the changed environmental information.

FIGS. 7A, 7B, 7C and 7D illustrate application examples of a plurality of driving environments and a preprocessing module according to an embodiment of the inventive concept.

Figure 7A:
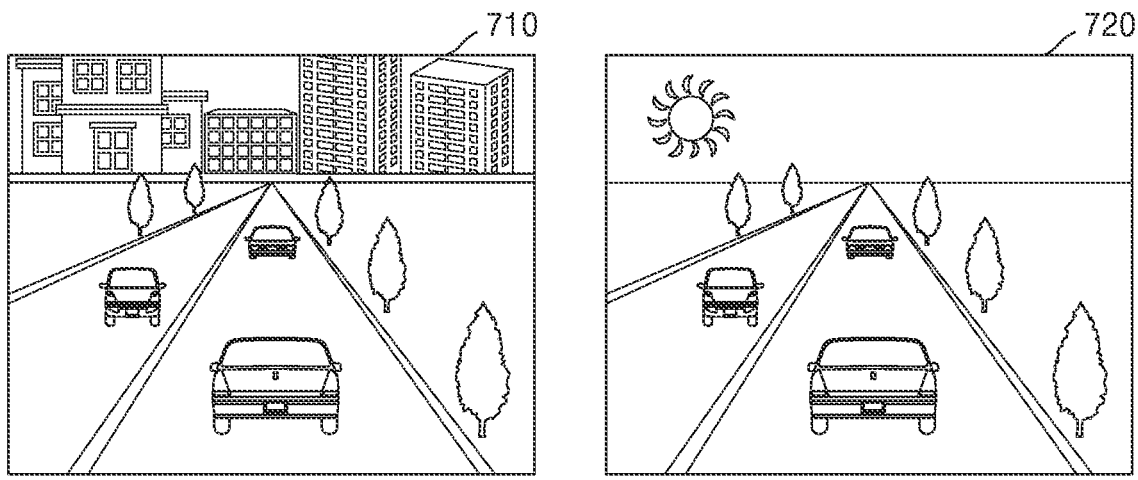
FIGS. 7A, 7B, 7C and 7D illustrate application examples of a plurality of driving environments and a preprocessing module according to an embodiment of the inventive concept.

Referring to FIG. 7A, the host vehicle 600 corresponding to an input image 710 is being driven through the city in a fine day at lunchtime. That is, the sensor module 200 may receive an illuminance value that is greater than the threshold value from the illuminance sensor 204 and may receive the output value of "0" from the rain sensor 202. The processor 300 may receive the sensing data from the sensor module 200 and may load the $PP_D$ and $OC_U$ layers mapped to the sensing data. The $PP_D$ layers of the preprocessing module 502 loaded on the RAM 400 may perform image processing on an input image and may output an input feature map to the feature point extraction module 504. The $OC_U$ layers of the decision module 506, which are loaded on the RAM 400, may obtain feature point information from the feature point extraction module 504 and may classify a class of an object. That is, the $PP_D$ layers of the preprocessing module 502, the layers of the feature point extraction module 504, and the $OC_U$ layers of the decision module 506 may dynamically form one neural network.

It may be noted that the host vehicle 600 corresponding to an input image 720 is being driven on the highway in a fine day at lunchtime. The sensor module 200 may receive an illuminance value that is greater than the threshold value from the illuminance sensor and may receive the output value of "0" from the rain sensor. The processor 300 may receive the sensing data from the sensor module 200 and may load the $PP_D$ and $OC_H$ layers mapped to the sensing data. The $PP_D$ layers of the preprocessing module 502 loaded on the RAM 400 may perform image processing on an input image and may output an input feature map to the feature point extraction module 504. The $OC_H$ layers of the decision module 506, which are loaded on the RAM 400, may obtain feature point information from the feature point extraction module 504 and may classify a class of an object. At this time, because an average driving speed on the highway is much higher than that in the city, rapid operation and output of the neural network may be required. In addition, because a traffic light or a crosswalk are not on the highway, the number of labels (classes) to be considered by the $OC_H$ layers of the decision module 506 may be reduced. When the driving position of the host vehicle 600 changes from the city to the highway, the processor 300 may adaptively change only the layers of the decision module 506 from the $OC_{HU}$ layers to the $OC_H$ layers so that the rapid operation and output of the neural network may be performed.

Figure 7B:
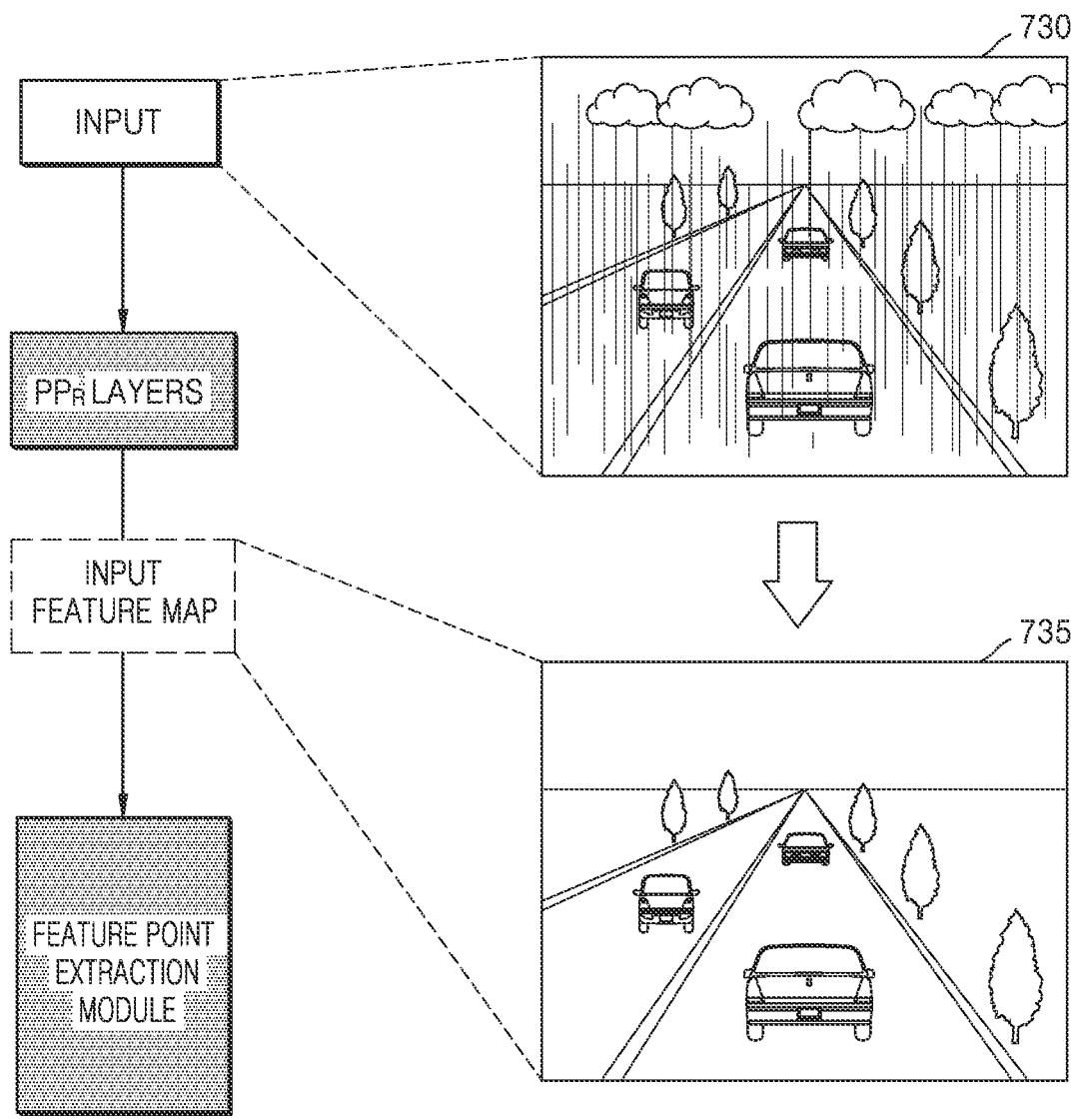

Referring to FIG. 7B, the $PP_R$ layers of the preprocessing module 502 may change a driving image 730 including raindrops to an image 735 in which the host vehicle 600 is driven in a fine day. For example, when the processor 300 receives the driving image 730 including raindrops, the layers of the preprocessing module 502 may be changed to the $PP_R$ layers. When the $PP_R$ layers of the preprocessing module 502 are completely learned, although the driving image 730 including raindrops is received, an input feature map received by the feature point extraction module 504 may be the same as an input feature map of the image in a fine day.

Figure 7C:
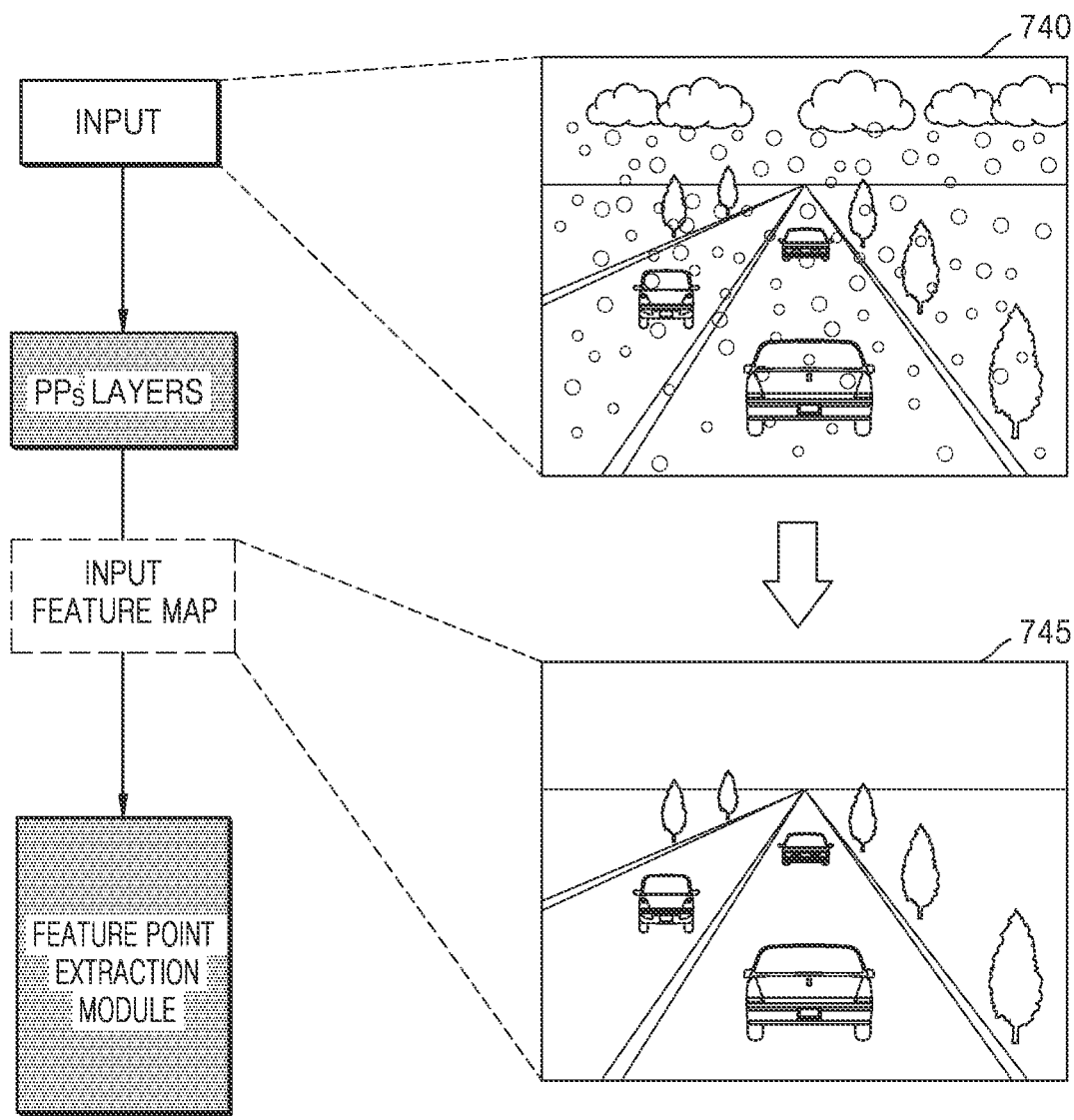

Referring to FIG. 7C, $PP_S$ layers of the preprocessing module 502 may change a driving image 740 including snowflakes to an image 745 in which the host vehicle 600 is driven in a fine day. For example, when the processor 300 receives a driving image 740 including snowflakes, the $PP_S$ layers of the preprocessing module 502 may be learned. When the $PP_S$ layers of the preprocessing module 502 are completely learned, although the driving image 740 including snowflakes is received, an input feature map received by the feature point extraction module 504 may be the same as an input feature map in a fine day.

Figure 7D:
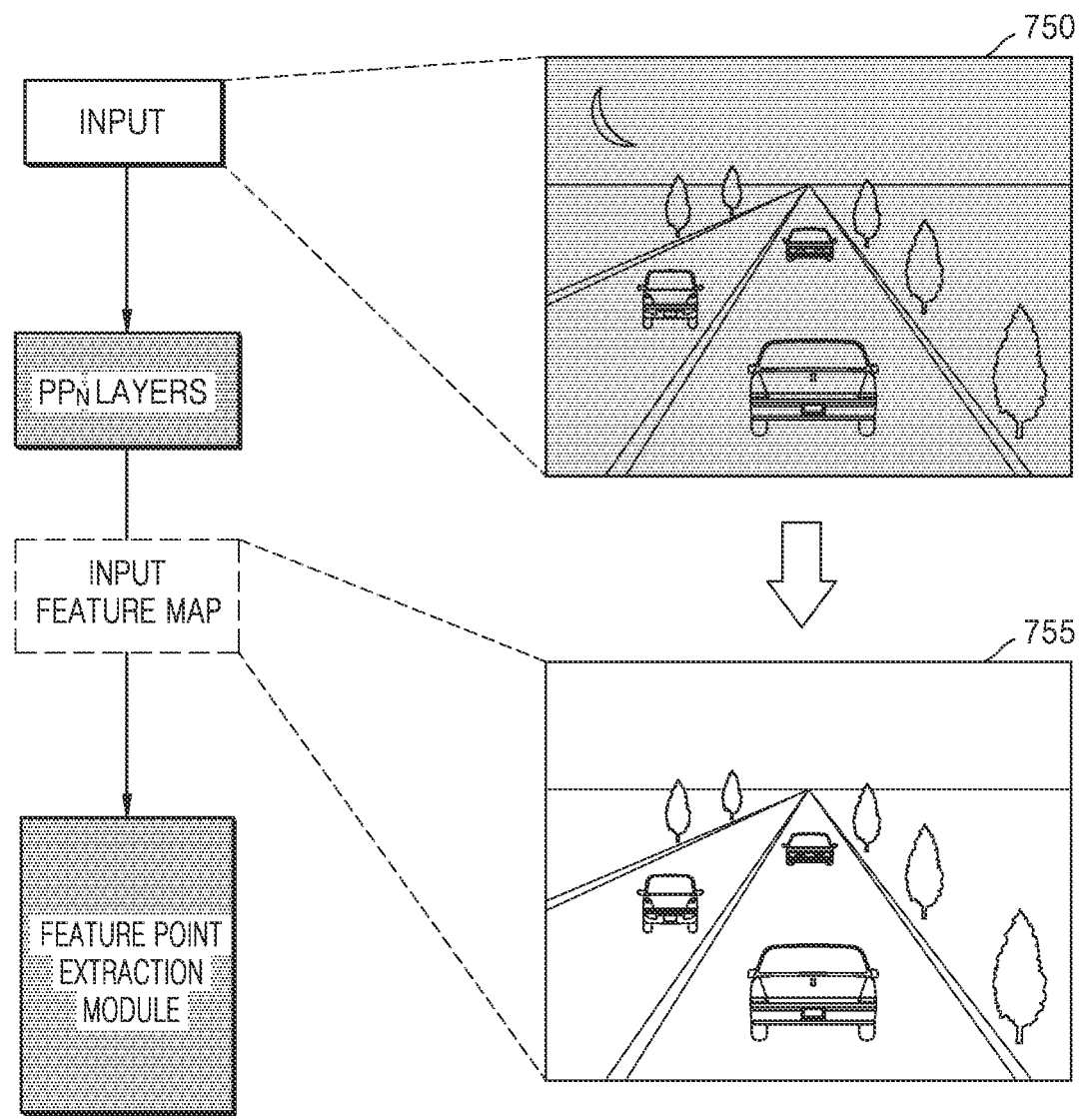

Referring to FIG. 7D, the $PP_N$ layers of the preprocessing module 502 may change a night driving image 750 with low brightness to an image 755 in which the host vehicle 600 is driven in a fine day. For example, when the processor 300 receives the night driving image 750 with low brightness, the $PP_N$ layers of the preprocessing module 502 may be learned. When the $PP_N$ layers of the preprocessing module 502 are completely learned, although the night driving image 750 with low brightness is received, an input feature map received by the feature point extraction module 504 may be the same as an input feature map of an image in a fine day.

According to the above-described embodiments, the feature point extraction module 504 may receive a uniform input feature map (for example, an input feature map of an image in which the host vehicle 600 is driven in a fine day at lunchtime) based on various layers of the preprocessing module 502 learned for various images. Therefore, the neural network does not need to additionally learn the feature point extraction module 504 and may efficiently use the RAM 400 and the storage 500 by sharing the feature point extraction module 504 for various driving situations and changing only the layers of the preprocessing module 502 and the decision module 506.

Figure 8:
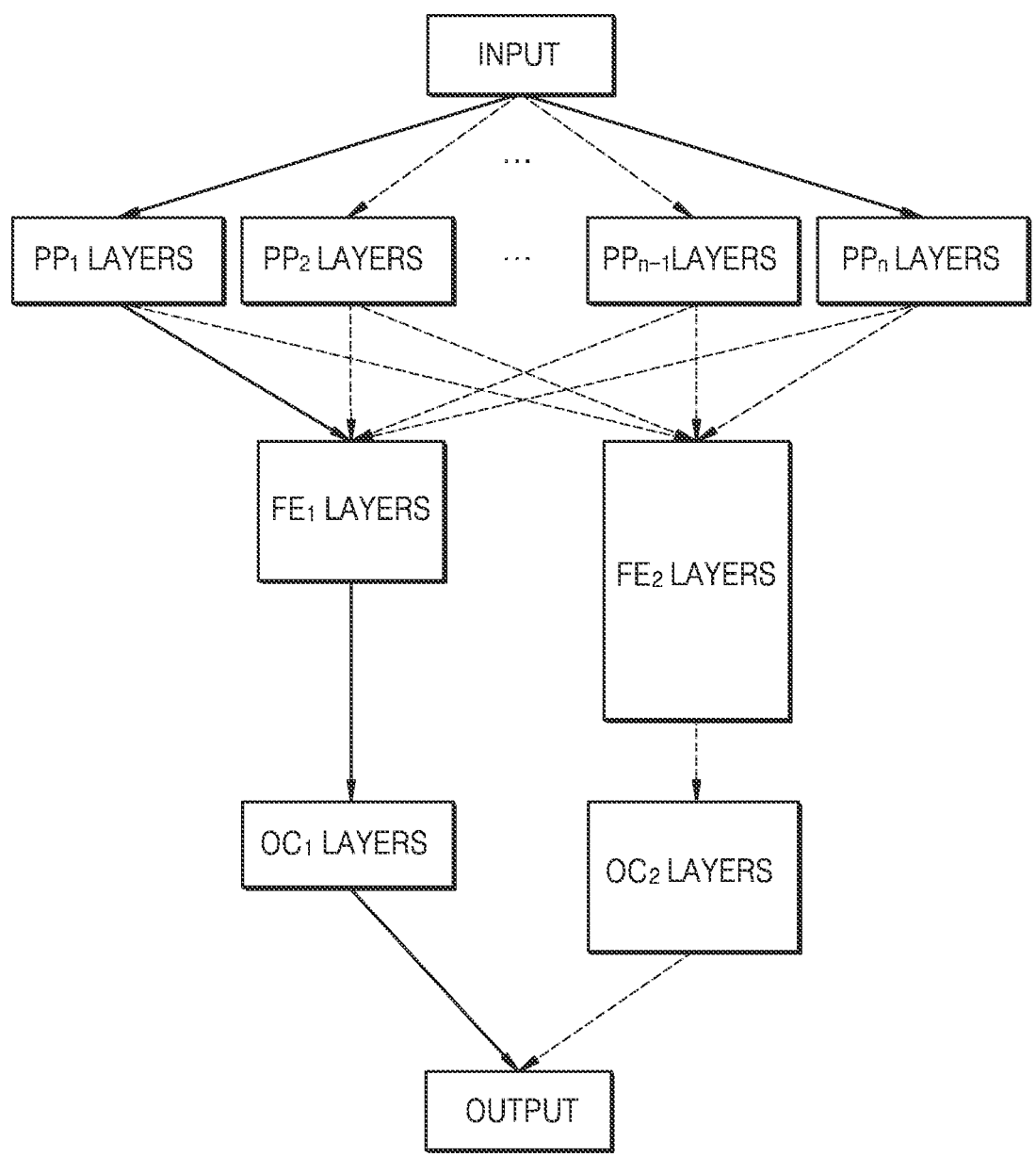
FIG. 8 is a block diagram of another example of a neural network according to an embodiment of the inventive concept.

FIG. 8 is a block diagram of another example of a neural network according to an embodiment of the inventive concept. FIG. 9 is a mapping table of environmental information and a feature point processing module according to an embodiment of the inventive concept.

Referring to FIG. 8, the neural network may select the layers of the feature point extraction module 504 from $FE_1$ layers and $FE_2$ layers. The $FE_1$ layers and $FE_2$ layers may be previously mapped to the layers of the decision module 506. For example, when the position information is "highway", the layers of the feature point extraction module 504 mapped to the $OC_H$ layers of the decision module 506 may be the $FE_1$ layers. In another example, when the position information is "urban", the layers of the feature point extraction module 504 mapped to the $OC_U$ layers of the decision module 506 may be the $FE_2$ layers. That is, because a driving speed on the highway of FIG. 9 is higher than that in the city, the storage 500 may require rapid operation and output of the neural network. In addition, when the host vehicle 600 is driven on the highway, because the number of labels (classes) of the Softmax function included in the $OC_H$ layers of the decision module 506 is small, a feature point to be extracted may be simplified For example, a feature point to be extracted on the highway may include only a window, a license plate, a square, a horizontal straight lane, and a color of the lane. In comparison with the case in which the host vehicle 600 is driven through the city, because objects such as a motorcycle, a bicycle, or a pedestrian are to be additionally detected in the city, the feature point extraction module further considers feature points such as a skin color of a person, shapes of hands or feet, and a circle. Therefore, when the position information is "highway", the layers of the feature point extraction module 504 may increase a processing speed by selecting the $FE_1$ layers and simplifying a filter.

Figure 10:
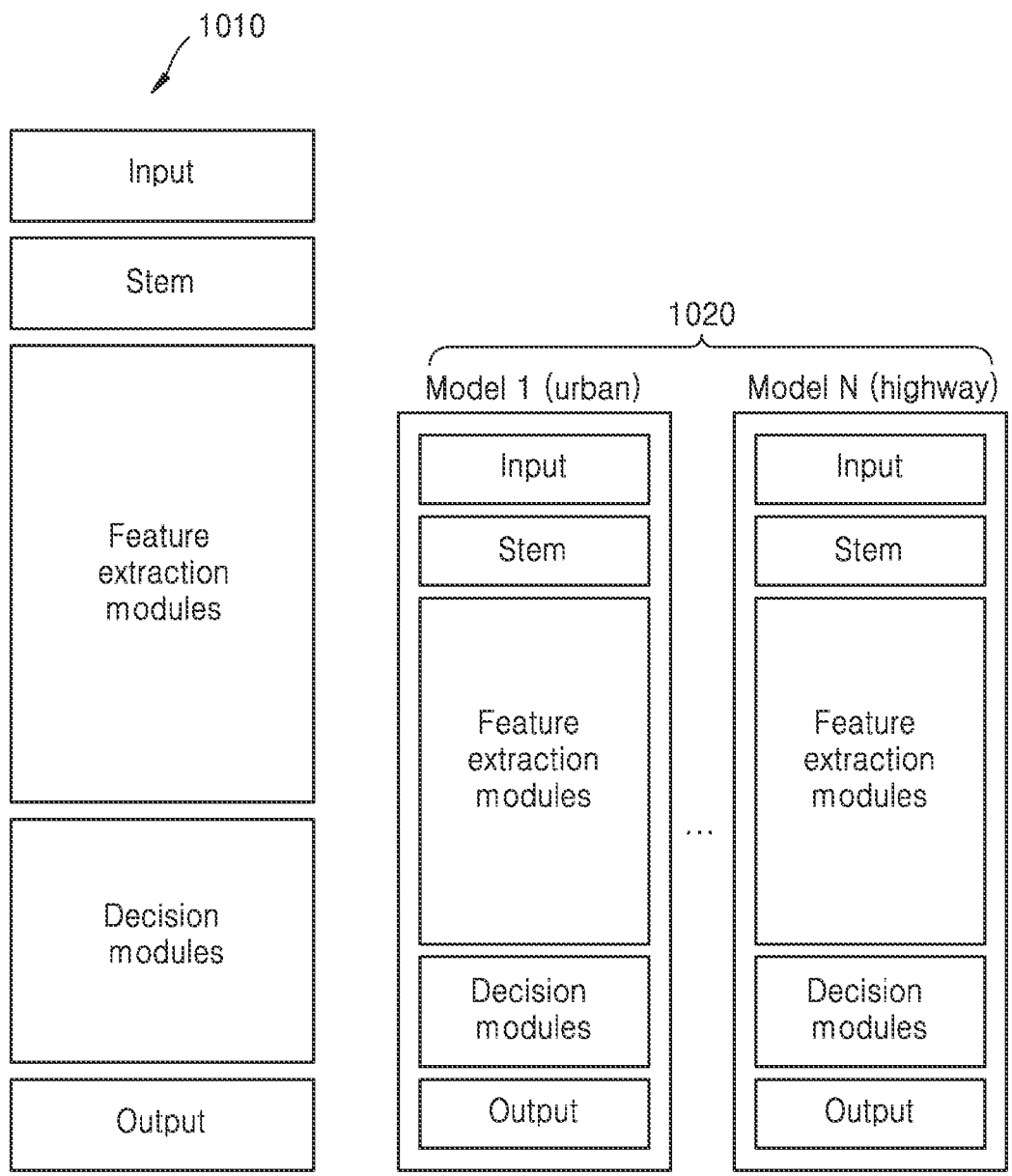
FIG. 10 is a block diagram of a comparative example of a neural network.

FIG. 10 is a block diagram of a comparative example of a neural network. Hereinafter, for convenience sake, it is described that weather information includes only "Day", "Snowy", "Rainy", and "Night" and position information includes only "Urban" and "Highway".

Referring to FIG. 10, a first neural network 1010 may correspond to an end-to-end structure. Here, the end-to-end structure may refer to a neural network simultaneously trained for one loss function. For example, the first neural network 1010 may need to learn each of eight driving environments obtained by combining the weather information with the position information. Therefore, an error may occur in a hardly probable driving environment. To prevent the error from occurring, a virtual data set for the hardly probable driving environment is to be generated and learned, which is disadvantageous.

A second neural network 1020 may correspond to a multiple structure. Here, the multiple structure may refer to including all neural networks respectively dedicated to the eight driving environments obtained by combining the weather information with the position information. Because the second neural network 1020 of the multiple structure uses learning data on each of various environments and stores a plurality of neural networks respectively corresponding to the various environments, the storage 500 may be inefficiently used. In addition, when a driving environment changes, a neural network corresponding to the changed driving environment is to be entirely loaded on the RAM 400, the RAM 400 may be inefficiently used.

While the inventive concept has been shown and described with reference to embodiments thereof, it will be understood that various changes in form and details may be made therein without departing from the spirit and scope of the following claims.

What is claimed is:

1. A computer-implemented method of operating a neural network device including a first neural network comprising a plurality of layers, the computer-implemented method comprising:
   receiving sensing data from at least one sensor;
   determining, by a processor, environmental information, based on the received sensing data;
   determining, by the processor, multiple layers in the plurality of layers of the first neural network, the multiple layers corresponding to the determined environmental information; and
   generating a second neural network for the neural network device by dynamically changing at least two layers, among the plurality of layers of the first neural network, to the determined multiple layers,
   wherein the environmental information corresponds to at least one of weather and a place, and
   wherein, the environmental information corresponds to a variation of the weather and the received sensing data is an image including the variation of the weather, the computer-implemented method further comprises:
      performing an image processing operation of the image and removing the variation from the image, by selecting a preprocessing layer corresponding to the environmental information among a group of preprocessing layers and by using the preprocessing layer, generating an input feature map based on the image processing operation, the input feature map representing the weather without the variation, and extracting a feature point from the input feature map.

2. The computer-implemented method of claim 1, further comprising:

classifying, by a decision module of the neural network device, at least one object into a class, based on the extracted feature point, wherein the determined multiple layers are included in either one or both of a preprocessing module and the decision module.

3. The computer-implemented method of claim 2, wherein the determining, by the processor, the environmental information further comprises:

determining, by the processor, weather information obtained by using on either one or both of an illuminance sensor and a rain sensor; and determining, by the processor, position information obtained by using a global positioning system (GPS).

4. The computer-implemented method of claim 3, wherein the determining, by the processor, the multiple layers comprises:

determining, by the processor, one or more layers corresponding to the determined weather information among one or more layers included in the preprocessing module; and determining, by the processor, one or more layers corresponding to the determined position information among one or more layers included in the decision module.

5. The computer-implemented method of claim 2, further comprising:

obtaining feature point information from the generated input feature map, using the feature point extraction module; and classifying, by the processor, at least one object included in the image into the class, using the obtained feature point information and the at least one of the determined multiple layers that is included in the decision module.

6. The computer-implemented method of claim 2, wherein the plurality of layers included in the neural network device is previously learned based on a first training data set corresponding to first weather information and first position information.

7. The computer-implemented method of claim 6, further comprising:

receiving a second training data set corresponding to second weather information and second position information;

determining, by the processor, one or more layers corresponding to the second weather information among one or more layers included in the preprocessing module;

determining, by the processor, one or more layers corresponding to the second position information among one or more layers included in the decision module; and learning, by the processor, the determined one or more layers corresponding to the second weather information and the determined one or more layers corresponding to the second position information.

8. The computer-implemented method of claim 7, wherein the determined one or more layers corresponding to the second weather information among the one or more layers included in the preprocessing module perform an image processing operation of correcting a feature map of an input image of the second training data set to be the same as a feature map of an input image of the first training data set.

9. The computer-implemented method of claim 7, wherein a number of classes of one or more layers corresponding to the first position information among the one or more layers included in the decision module is different from a number of classes of the one or more layers corresponding to the second position information among the one or more layers included in the decision module.

10. A neural network device including a first neural network comprising a plurality of layers, the neural network device comprising:

at least one sensor configured to obtain sensing data; and a processor configured to:

determine environmental information, based on the obtained sensing data;

determine multiple layers in the plurality of layers of the first neural network, the multiple layers corresponding to the determined environmental information; and generate a second neural network for the neural network device by dynamically changing at least two layers, among the plurality of layers of the first neural network, to the determined multiple layers, wherein the environmental information corresponds to at least one of weather and a place, wherein, when the environmental information corresponds to a variation of the weather and the sensing data is an image including the variation of the weather, the processor is further configured to:

perform an image processing operation of the image and removing the variation from the image, by selecting a preprocessing layer corresponding to the environmental information among a group of preprocessing layers and by using the preprocessing layer, generate an input feature map based on the image processing operation, and extract a feature point from the input feature map.

11. The neural network device of claim 10, wherein the processor is further configured to classify at least one object into a class based on the extracted feature point, wherein the determined multiple layers are related to either one or both of the correcting the input image and the classifying the at least one object into the class based on the extracted feature point.

12. The neural network device of claim 11, wherein the at least one sensor comprises an illuminance sensor, a rain sensor, and a global positioning system (GPS), and wherein the processor is further configured to:

determine weather information, using on either one or both of the illuminance sensor and the rain sensor; and determine position information, using the GPS.

13. The neural network device of claim 12, wherein the neural network device further comprises a memory previously storing a plurality of first layers related to the correcting the input image, a plurality of third layers related to the extracting the feature point from the corrected image, and a plurality of second layers related to the classifying the at least one object into the class based on the extracted feature point, and wherein the processor is further configured to:

identify at least one layer corresponding to the determined weather information among the plurality of first layers;

identify at least one layer corresponding to the determined position information among the plurality of third layers;

identify at least one layer corresponding to the determined position information among the plurality of second layers.

14. The neural network device of claim 13, wherein a number of classes of at least one layer corresponding to first position information among the plurality of second layers is greater than a number of classes of one or more layers corresponding to second position information among one or more layers.

15. The neural network device of claim 11, wherein the processor is further configured to:
obtain feature point information from the generated input feature map; and
classify at least one object included in the image into the class, using the obtained feature point information and the at least one of the determined multiple layers corresponding to second one or more layers.

16. The neural network device of claim 11, wherein the processor is further configured to:
receive a second training data set corresponding to second weather information and second position information;
determine at least one layer corresponding to the second weather information among first one or more layers related to the correcting the input image;
determine at least one layer corresponding to the second position information among second one or more layers related to the classifying the at least one object into the class based on the extracted feature point; and
learn the determined at least one layer corresponding to the second weather information and the determined at least one layer corresponding to the second position information.

17. The neural network device of claim 16, wherein the determined at least one layer corresponding to the second weather information among the first one or more layers perform an image processing operation of correcting a feature map of an input image of the second training data set to be the same as a feature map of an input image of a first training data set.

18. The neural network device of claim 16, wherein a number of classes of at least one layer corresponding to first position information among the second one or more layers is different from a number of classes of the at least one layer corresponding to the second position information among the second one or more layers.

19. A host vehicle device comprising:
a neural network device comprising a first neural network comprising a plurality of layers; and
a vehicle controller configured to control a host vehicle, based on an output of the neural network device,
wherein the neural network device comprises:
at least one sensor configured to obtain sensing data; and
a processor configured to:
determine environmental information, based on the obtained sensing data;
determine multiple layers in the plurality of layers of the first neural network, the multiple layers corresponding to the determined environmental information; and
generate a second neural network for the neural network device by dynamically changing at least two layers, among the plurality of layers of the first neural network, to the determined multiple layers, and
wherein the environmental information corresponds to at least one of weather and a place,
wherein, when the environmental information corresponds to a variation of the weather and the sensing data is an image including the variation of the weather, the processor is further configured to:
performing an image processing operation of the image and removing the variation from the image, by selecting a preprocessing layer corresponding to the environmental information among a group of preprocessing layers and by using the preprocessing layer,
generating an input feature map based on the image processing operation, the input feature map representing the weather without the variation, and
extracting a feature point from the input feature map.

20. The host vehicle device of claim 19, wherein the determined multiple layers are included in either one or both of a preprocessing module and a decision module included in the neural network device, and
wherein the output indicates whether at least one object is on a lane on which the host vehicle is being driven.

* * * * *